United States Patent
Takamura (10) Patent No.: US 11,301,239 B2
(45) Date of Patent: Apr. 12, 2022

(54) DEVICE, COMPUTER SYSTEM, DEVICE-BASED FIRMWARE DETERMINATION METHOD, AND PROGRAM

(71) Applicant: NEC Platforms, Ltd., Kawasaki (JP)

(72) Inventor: Nobuhito Takamura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/043,345

(22) PCT Filed: Mar. 26, 2019

(86) PCT No.: PCT/JP2019/012827
§ 371 (c)(1),
(2) Date: Sep. 29, 2020

(87) PCT Pub. No.: WO2019/189163
PCT Pub. Date: Oct. 3, 2019

(65) Prior Publication Data
US 2021/0026619 A1    Jan. 28, 2021

(30) Foreign Application Priority Data
Mar. 30, 2018    (JP) .............................. JP2018-069998

(51) Int. Cl.
*G06F 8/65*    (2018.01)
(52) U.S. Cl.
CPC ...................................... *G06F 8/65* (2013.01)
(58) Field of Classification Search
CPC ....................................................... G06F 8/65
See application file for complete search history.

(56) References Cited

U.S. PATENT DOCUMENTS

| | | | | |
|---|---|---|---|---|
| 2006/0225069 | A1* | 10/2006 | Yuuki | G06F 8/65 717/170 |
| 2008/0082657 | A1* | 4/2008 | Hart | H04L 41/0681 709/224 |
| 2015/0149992 | A1* | 5/2015 | Wade | G06Q 20/3223 717/173 |
| 2018/0018161 | A1* | 1/2018 | Gattu | G06F 8/656 |
| 2019/0286379 | A1* | 9/2019 | Tojo | G06F 3/1203 |

FOREIGN PATENT DOCUMENTS

| | | |
|---|---|---|
| JP | 2002-108582 A | 4/2002 |
| JP | 2006-260330 A | 9/2006 |
| JP | 2015-069315 A | 4/2015 |
| JP | 2016-130887 A | 7/2016 |

OTHER PUBLICATIONS

International Search Report for PCT Application No. PCT/JP2019/012827, dated Jun. 25, 2019.

* cited by examiner

*Primary Examiner* — Daxin Wu
(74) *Attorney, Agent, or Firm* — Sughrue Mion, PLLC (57) ABSTRACT

What is provided is a device which is added to a computer system and operated by firmware, the device including a policy designation unit configured to cause a storage unit to store, in advance, a user policy for defining conditions for determining the firmware in a case where there is no version information of the firmware recommended for the device, and a firmware determination unit configured to determine the firmware to be applied to the device on the basis of the user policy in a case where information indicating that there is no version information of the firmware has been acquired when the firmware is determined.

7 Claims, 8 Drawing Sheets

OS/DEVICE FIRMWARE CORRESPONDENCE TABLE — 401

EMPTY

FIG. 5

| 501 | 502 | 503 | 504 SUPPORT FLAG (UPPER STAGE:TYPE/LOWER STAGE:VERSION) | | | | | | |
|---|---|---|---|---|---|---|---|---|---|
| | | | OS-A | | | OS-B | | OS-C | |
| IMAGE ID | VERSION | TIME STAMP | A1 | A2 | A3 | B1 | B2 | C1 | C2 |
| 1 | A | 2015/10 | S | U | U | S | U | S | U |
| 2 | B | 2016/03 | S | S | U | S | S | E | E |
| 3 | C | 2016/07 | U | E | S | U | S | U | S |

S: STABLE VERSION (Stable)
E: EXPERIMENTAL VERSION (Experimental)  } 505
U: UNSUPPORTED (Unsupported)

DEVICE, COMPUTER SYSTEM, DEVICE-BASED FIRMWARE DETERMINATION METHOD, AND PROGRAM

This application is a National Stage Entry of PCT/JP2019/012827 filed on Mar. 26, 2019, which claims priority from Japanese Patent Application 2018-069998 filed on Mar. 30, 2018, the contents of all of which are incorporated herein by reference, in their entirety.

TECHNICAL FIELD

The present invention relates to a device, a computer system, a device-based firmware determination method, and a program.

BACKGROUND ART

Among computer systems, there is a computer system in which an IO device realizing an extension function can be added. The IO device added in this manner needs to be operated in various computer systems. IO devices can be operated in different computer systems by updating firmware.

Patent Document 1 discloses a technique related to updating of firmware as the related art.

CITATION LIST

Patent Literature

[Patent Document 1]
Japanese Unexamined Patent Application, First Publication No. 2006-260330

SUMMARY OF THE INVENTION

Problems to be Solved by the Invention

Incidentally, in a technique disclosed in Patent Document 1, the version of firmware of a system board which is newly used may be different from the version of firmware which has been used in a partition which is a replacement location at the time of replacing a system board. In this case, the firmware of the system board which is newly used is changed to the firmware of the version that has been used in a partition which is a replacement location.

For this reason, in a case where the technique disclosed in Patent Document 1 is used in a computer system in which an IO device realizing an extension function can be added, there is a possibility that the following situation will occur. That is, even when the firmware of the IC device which is newly used is firmware having a user's desired performance, there is a possibility that the firmware will be changed to firmware having performance that the user does not desire.

An example object of each of aspects of the present invention is to provide a device, a computer system, a device-based firmware determination method, and a program which are capable of solving the above-described problem.

Means for Solving the Problems

In order to achieve the aforementioned objects, according to an aspect of the present invention, a device, which is added to a computer system and operated by firmware, includes a policy designation unit configured to cause a storage unit to store, in advance, a user policy for defining conditions for determining the firmware in a case where there is no version information of the firmware recommended for the device, and a firmware determination unit configured to determine the firmware to be applied to the device on the basis of the user policy in a case where information indicating that there was no version information of the firmware has been acquired when the firmware was determined has been acquired.

According to another aspect of the present invention, a computer system includes the above-described device, and an input and output control unit configured to specify firmware recommended for the device on the basis of a device ID for identifying the device and outputs the specified firmware to the device.

According to still another aspect of the present invention, a device-based firmware determination method is a firmware determination method performed by a device which is added to a computer system and operated by firmware. The device-based firmware determination method includes causing a storage unit to store, in advance, a user policy for defining conditions for determining the firmware in a case where there is no version information of the firmware recommended for the device, and determining the firmware to be applied to the device on the basis of the user policy in a case where information indicating that there is no version information of the firmware has been acquired when the firmware is determined.

According to still another aspect of the present invention, a program causes a computer of a device which is added to a computer system and operated by firmware to cause a storage unit to store, in advance, a user policy for defining conditions for determining the firmware in a case where there is no version information of the firmware recommended for the device, and determine the firmware to be applied to the device on the basis of the user policy in a case where information indicating that there is no version information of the firmware has been acquired when the firmware is determined.

Advantageous Effects of Invention

According to the embodiment of the present invention, it is possible to determine a user's desired firmware in a case where there is no version of firmware recommended for a device.

EXAMPLE EMBODIMENT

Embodiment

Hereinafter, an embodiment will be described in detail with reference to the accompanying drawings.

Figure 1:
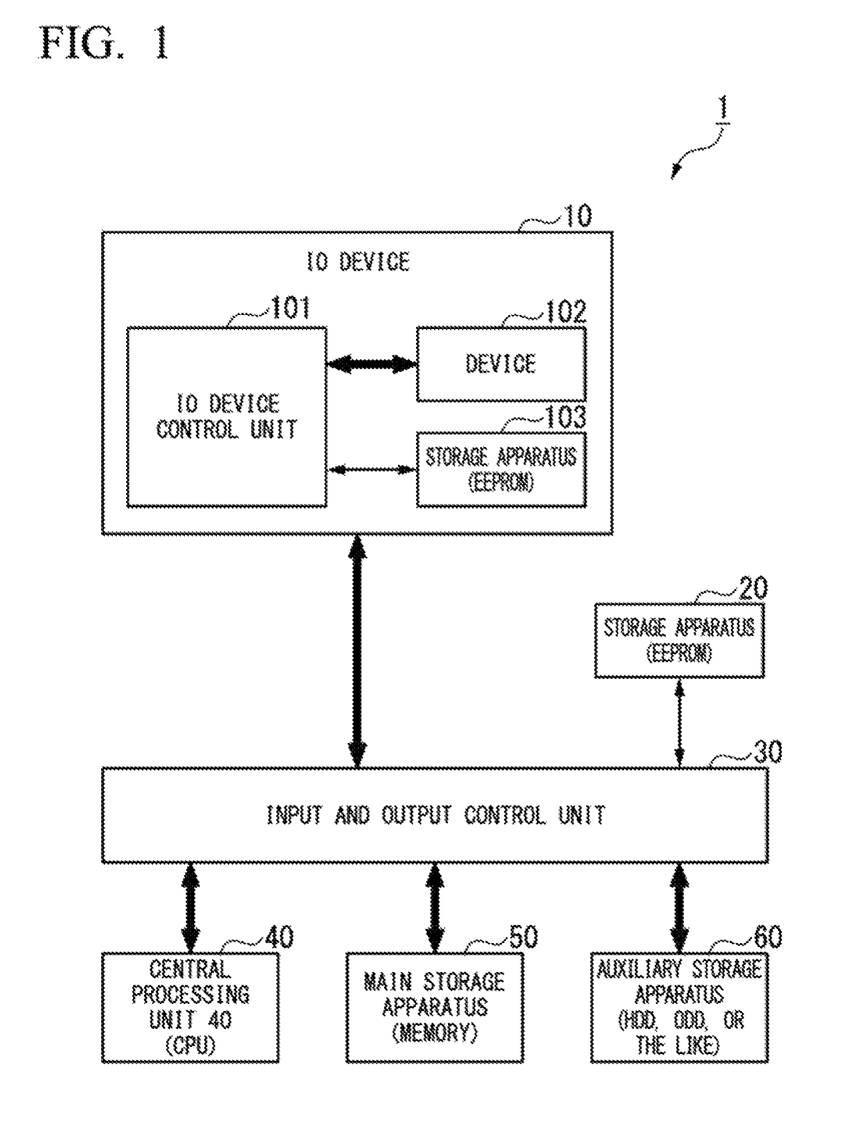
FIG. 1 is a diagram showing a configuration of a computer system according to an embodiment of the present invention.

As shown in FIG. 1, a computer system 1 includes an input output (TO) device 10 (an example of a device), a storage apparatus 20, an input and output control unit 30, a central processing unit 40, a main storage apparatus 50, and an auxiliary storage apparatus 60.

The input and output control unit 30 is connected to each of the IO device 10, the storage apparatus 20, the central processing unit 40, the main storage apparatus 50, and the auxiliary storage apparatus 60.

The IO device 10 is a device which is added in the computer system 1. As shown in FIG. 1, the IO device 10 includes an IO device control unit 101 (an example of a policy designation unit, an example of a firmware determination unit), a device 102, and a storage apparatus 103.

The IO device control unit 101 transmits and receives a signal to and from the input and output control unit 30. In addition, the IO device control unit 101 transmits and receives a signal for controlling the operation of the device 102 to and from the device 102 between operations of the device 102.

The device 102 executes a function determined for each added IO device 10.

Figure 3:
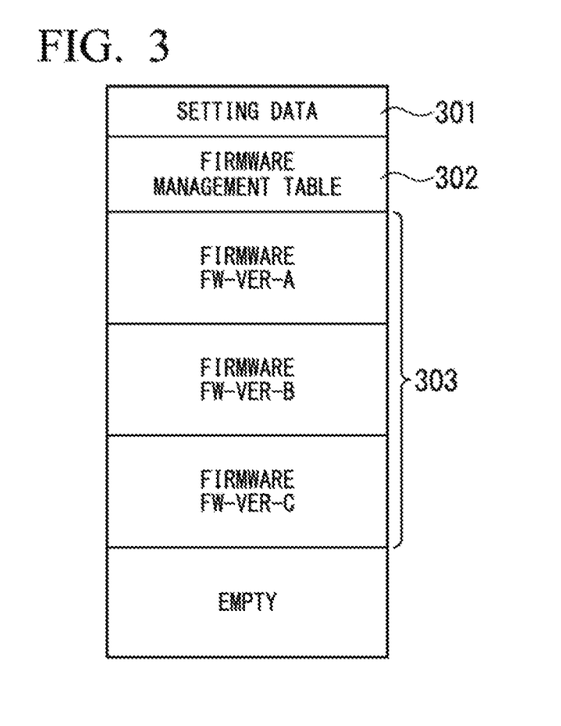
FIG. 3 is a diagram showing an example of information stored in a storage apparatus according to the embodiment of the present invention.

The storage apparatus 103 stores various information necessary for processing performed by the IO device 10. For example, the storage apparatus 103 may be a non-volatile memory such as an electrically erasable programmable read-only memory (EEPROM) or a FLASH memory. As shown in FIG. 3, the storage apparatus 103 is used such that a storage region is divided, and stores setting data 301, firmware 303, and the like of the IO device control unit 101.

FIG. 3 is a diagram schematically showing an example of information stored in the storage apparatus 103. The setting data 301 includes setting values of the IO device control unit 101 and the device 102, device drivers for a plurality of operating systems (OS), information of the version of firmware required for the device 102, and the like. In addition, the setting data 301 includes identification information for identifying the IO device 10, and the like.

Figures 4, 5:
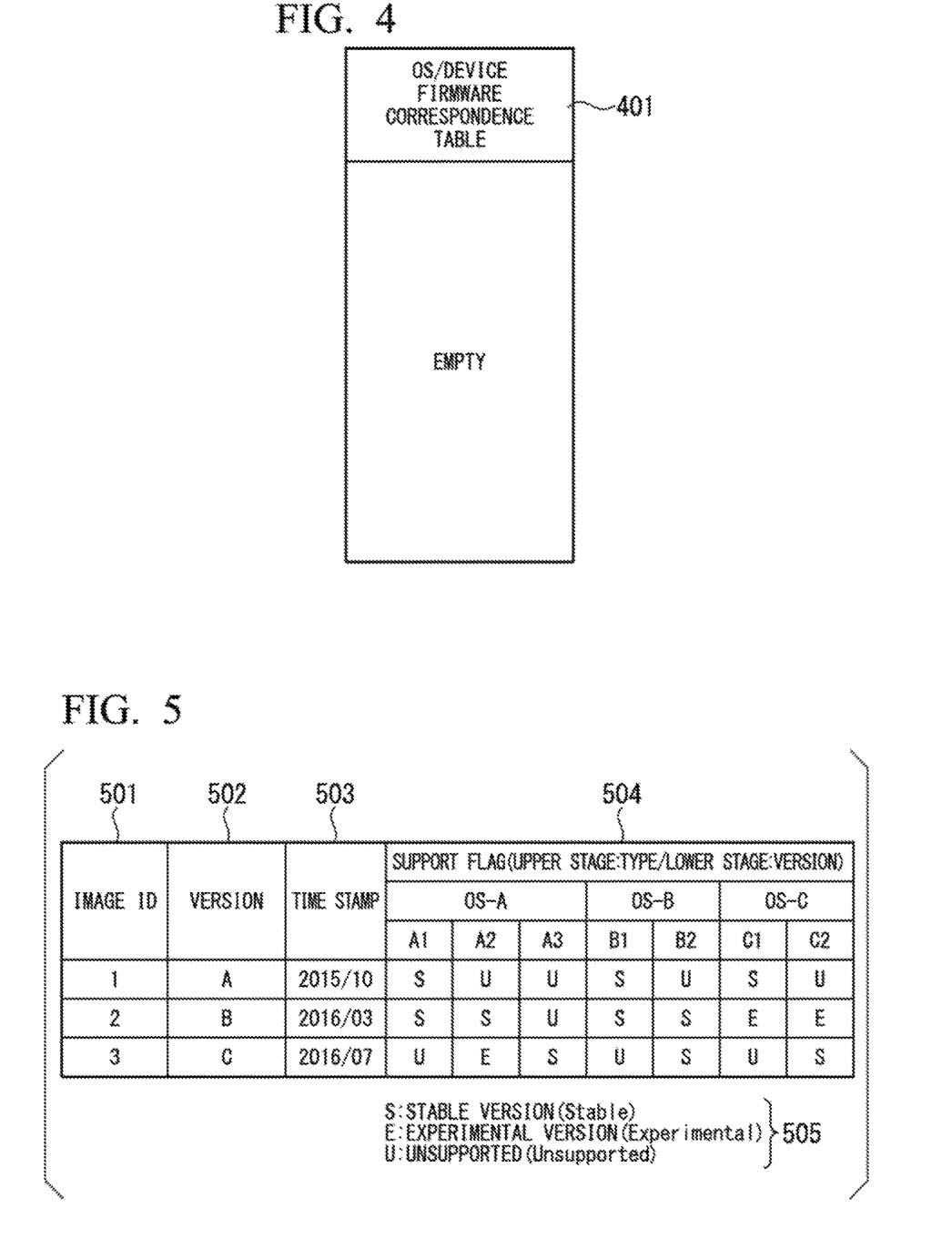
FIG. 4 is a diagram showing an example of information stored in the storage apparatus according to the embodiment of the present invention.
FIG. 5 is a diagram showing an example of a firmware management table according to the embodiment of the present invention.

In addition, information regarding the firmware 303 is included in a firmware management table 302. That is, the firmware management table 302 includes information regarding the firmware 303 stored in the storage apparatus 103. FIG. 5 is a diagram showing an example of the firmware management table 302.

According to FIG. 5, the firmware management table 302 includes, for example, an ID 501, a version 502, a time stamp 503, and a support flag 504. The image ID 501 in the firmware management table 302 is a field in which identification number information of a firmware image is stored. The version 502 is a field in which version information of a firmware image is stored. The time stamp 503 is a field in which information indicating the date when firmware was created which is stored in the firmware or information indicating the date when the firmware is issued is stored. The support flag 504 is a field in which an OS capable of supporting firmware and the version thereof are indicated according to an entry in a flag definition 505.

Information of the respective fields is managed for each item of firmware in the firmware management table 302. The IO device control unit 101 generates, updates, refers to, and manages the firmware management table 302.

Referring back to FIG. 1, the storage apparatus 20 is a non-volatile memory such as an EEPROM or a FLASH memory. FIG. 4 is a diagram schematically showing an example of information stored in the storage apparatus 20. As shown in FIG. 4, the storage apparatus 20 is used such that a storage region is divided, and stores, for example, an OS/device firmware correspondence table 401. Here, an example of the OS/device firmware correspondence table 401 will be described according to FIG. 6.

Figure 6:
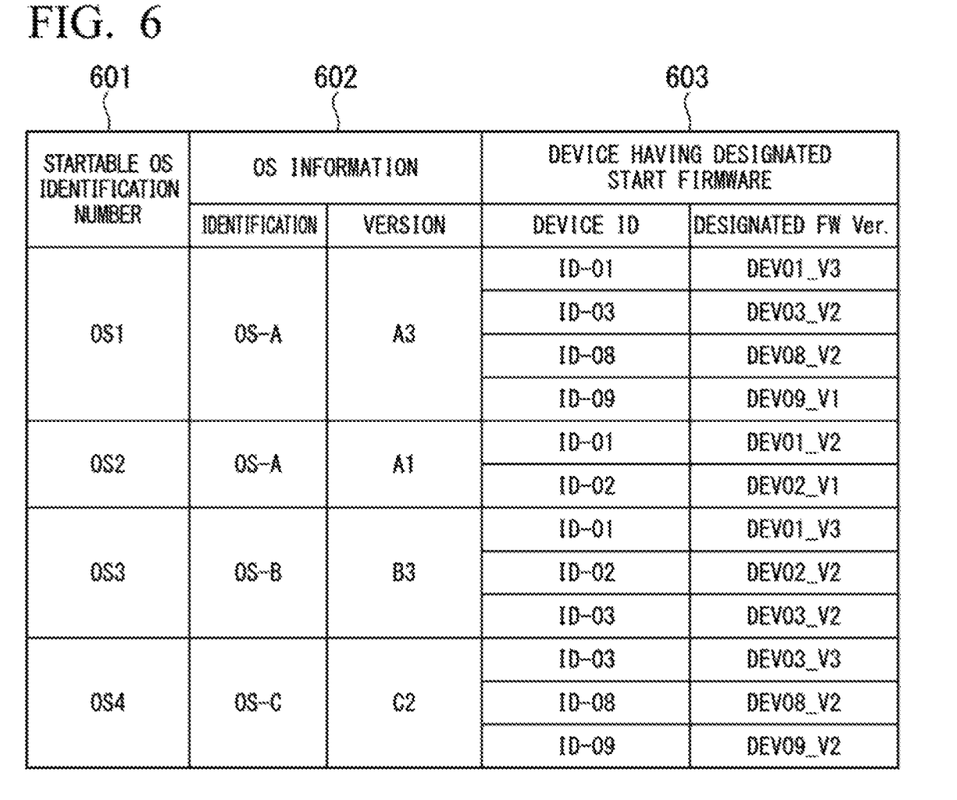
FIG. 6 is a diagram showing an example of an OS/device firmware correspondence table according to the embodiment of the present invention.

FIG. 6 is a diagram showing an example of an OS/device firmware correspondence table 401. According to FIG. 6, the OS/device firmware correspondence table 401 includes, for example, a startable OS identification number 601, OS information 602, and a start firmware designation device 603.

The startable OS identification number 601 in the OS/device firmware correspondence table 401 is a field for storing an identification number of environment of a startable OS by the computer system 1. The OS information 602 is a field in which the type of OS and version information thereof are stored. The start firmware designation device 603 is a field in which ID information (device ID) of the device 102 having a designated version of firmware starting for the IO device 10 in an OS environment and the version (designated firmware Ver) of firmware corresponding to the ID information are stored.

In the OS/device firmware correspondence table 401, information of the respective fields is managed for each OS environment. The central processing unit 40 generates, updates, refers to, and manages the OS/device firmware correspondence table 401 in accordance with a program. The program collects information of designated firmware for starting the IO device 10 in the OS environment from a device driver having the information.

Figure 8:
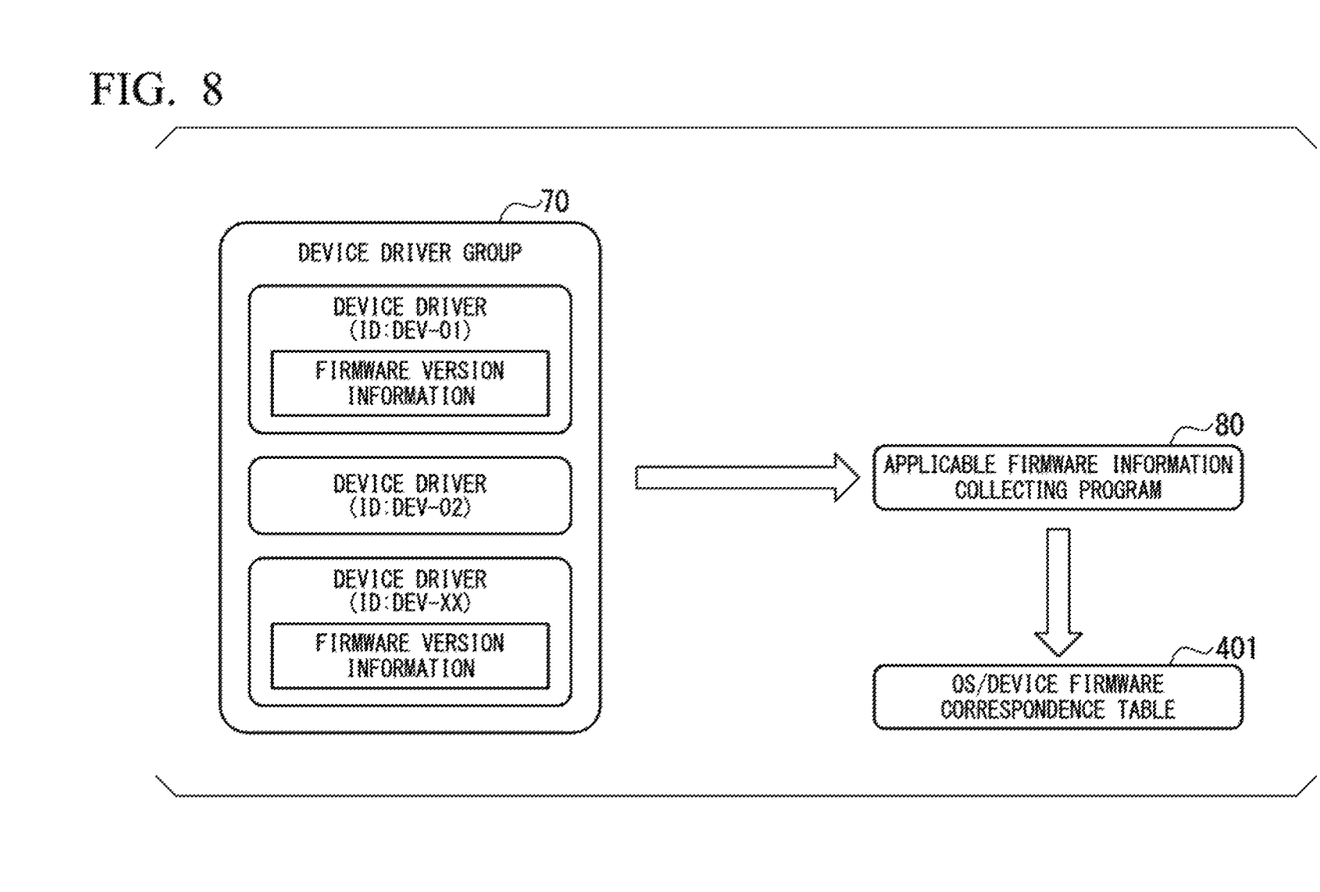
FIG. 8 is a diagram showing the recording of information in the OS/device firmware correspondence table in the embodiment of the present invention.

Here, the generation of the OS/device firmware correspondence table 401 shown in FIG. 6 will be described using FIG. 8. FIG. 8 is a diagram showing a process of recording information in the OS/device firmware correspondence table 401.

As shown in a device driver group 70 in FIG. 8, an OS includes a large number of device drivers so as to operate various devices 102. The device drivers are programs for controlling the devices 102. The central processing unit 40 distinguishes the devices 102 to be controlled in accordance with devices ID (for example, a peripheral component interconnect (PCI) ID) imparted to the devices 102. In addition, the device driver stores version information of support firmware which is firmware applicable to the device 102 among pieces of firmware.

Further, a support firmware information collecting program 80 operating on an OS is installed. The central processing unit 40 operates the support firmware information collecting program 80 at a timing such as when an OS is started or when the device driver is updated. The support firmware information collecting program 80 has a function of collecting device ID information and firmware information from the device driver.

The support firmware information collecting program 80 collects a device ID and applicable firmware information with respect to a device having firmware version information. That is, the support firmware information collecting program 80 acquires a device ID having a designated version of firmware starting for the IO device 10 in an OS environment and version information of firmware corresponding to the device ID from the device driver. The support firmware information collecting program 80 stores collected information in the OS/device firmware correspondence table 401 together with operation OS information (an OS type, a version).

In this manner, the central processing unit 40 records and updates information in the OS/device firmware correspondence table 401 by executing the support firmware information collecting program 80.

Referring back to FIG. 1, the input and output control unit 30 controls the transmission and reception of a signal to and from each apparatus of the central processing unit 40, the main storage apparatus 50, and the auxiliary storage apparatus 60. In addition, the input and output control unit 30 generates notification information and outputs the generated notification information to the IO device control unit 101.

Figure 9:
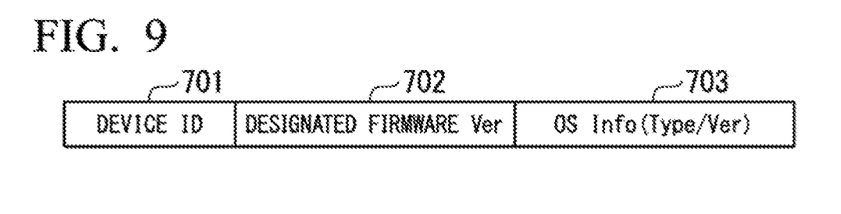
FIG. 9 is a diagram showing an example of notification information in the embodiment of the present invention.

FIG. 9 is a diagram showing an example of notification information. As shown in FIG. 9, the notification information includes, for example, a device ID 701, a designated firmware Ver 702, and an OS_Info 703. In the device ID 701 in the notification information, ID information of the IO device 10 is recorded. For example, the ID information is a PCI ID. In the designated firmware Ver 702, version information of firmware of the IO device 10 is stored. The version information stored in the designated firmware Ver 702 is version information of firmware required by a device driver on an OS. In the OS_Info (Type/Ver) 703, a type (Type) and a version (Ver) of an OS which is started by the computer system 1 this time are stored.

Referring back to FIG. 1, the central processing unit 40 executes processing such as arithmetic calculation.

The main storage apparatus 50 is used for the storage of data used in arithmetic processing, and the like.

The auxiliary storage apparatus 60 stores an OS image. The auxiliary storage apparatus 60 may store a plurality of OS images. The auxiliary storage apparatus 60 is, for example, a hard disk. The auxiliary storage apparatus 60 can use a storage region thereof by dividing the storage region into a plurality of parts as shown in FIG. 2.

Figure 2:
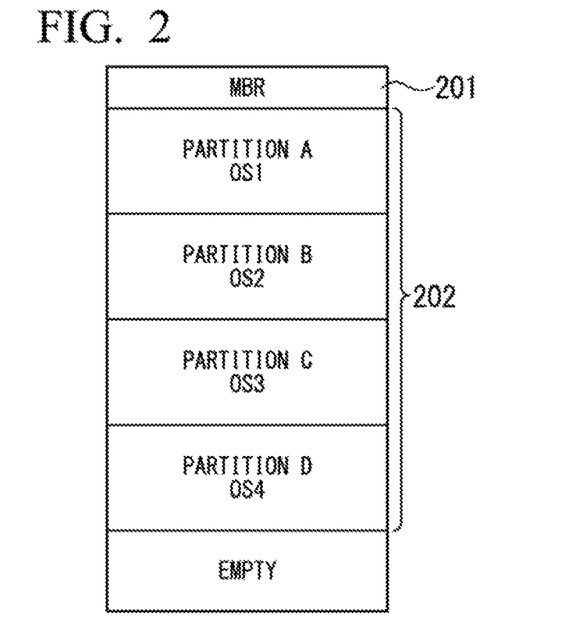
FIG. 2 is a diagram showing an example of information stored in an auxiliary storage apparatus according to the embodiment of the present invention.

FIG. 2 is a diagram showing an example of information stored in the auxiliary storage apparatus 60. A management table for managing a partition region (partition) in the auxiliary storage apparatus 60, which is called a master boot record (MBR) 201, is stored in the leading storage region of the auxiliary storage apparatus 60. Partitions 202 includes, for example, partitions A, B, C, and D. An OS environment 1 is stored in the partition A. An OS environment 2 is stored in the partition B. An OS environment 3 is stored in the partition C. An OS environment 4 is stored in the partition D.

Figure 7:
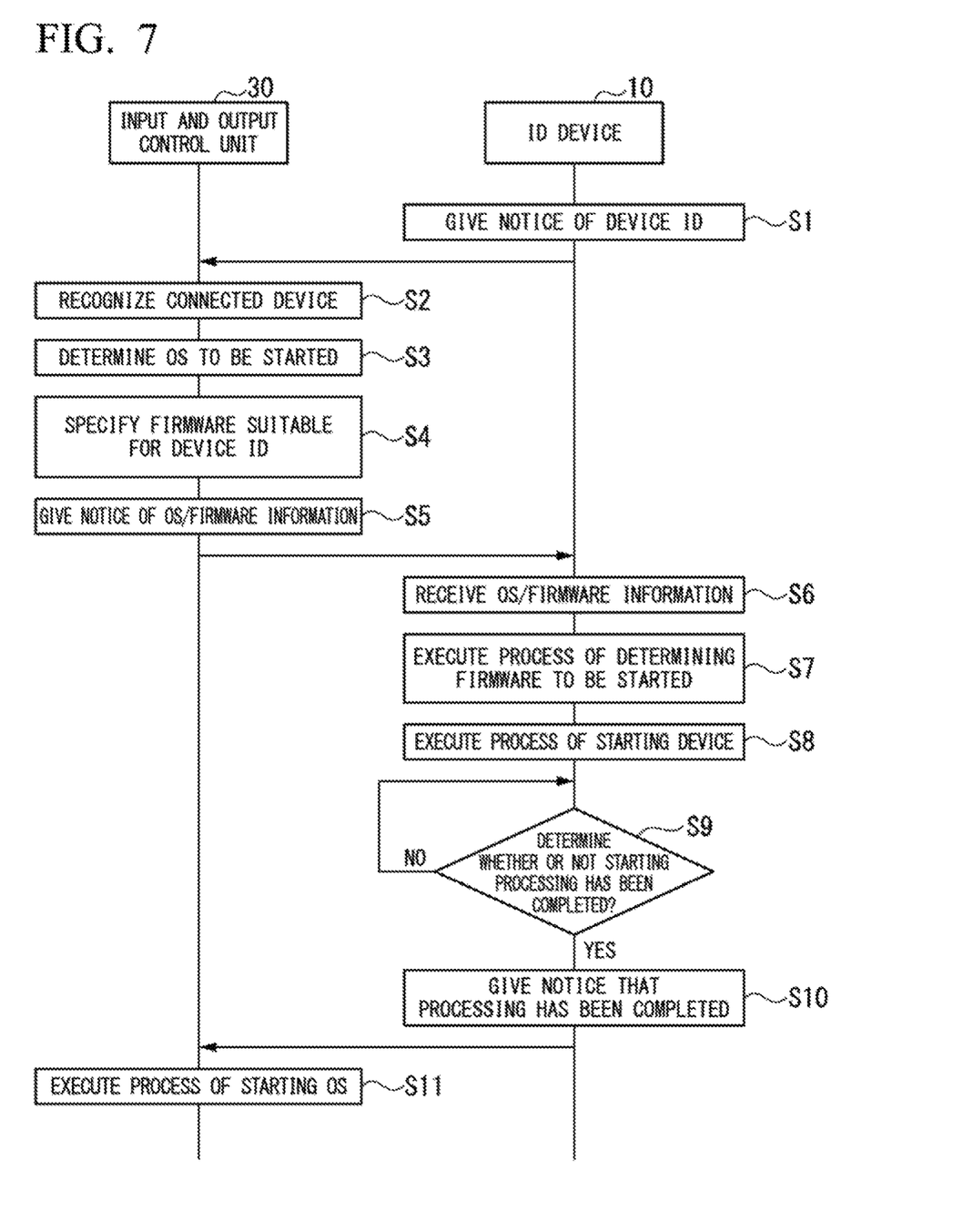
FIG. 7 is a first diagram showing a processing flow of the computer system according to the embodiment of the present invention.

Next, processing of the computer system 1 according to the embodiment of the present invention will be described with reference to FIG. 7. FIG. 7 is a first diagram showing a processing flow of the computer system according to the embodiment. Here, operations of the input and output control unit 30 and the IO device 10 in the starting of the computer system 1 shown in FIG. 7 will be described.

When a power supply of the computer system 1 is turned on, the computer system 1 starts to operate. When the computer system 1 starts to operate, the device 102 is initialized in the IO device 10. A specific example will be described hereinafter.

The IO device control unit 101 reads a device ID included in setting data 301 (FIG. 3) stored in the storage apparatus 103. The IO device control unit 101 outputs (gives notice of) the read device ID to the input and output control unit 30 (step S1).

The input and output control unit 30 receives a device ID from the IO device 10. The input and output control unit 30 recognizes the device 102 connected thereto on the basis of the received device ID (step S2).

After the power supply is turned on, a process of starting the computer system 1 is executed in the computer system 1, and an OS to be started is determined through a process of deciding an OS to be started in the starting process (for example, a process in which the central processing unit 40 started by a starting program stored in a basic input output system (BIOS) decides an OS selected by a user's operation) (step S3).

When an OS to be started is determined, the input and output control unit 30 reads out the OS/device firmware correspondence table 401 (FIG. 6) from the storage apparatus 20. The input and output control unit 30 specifies an OS matching the OS to be started, among the startable OS identification numbers 601 in the read-out OS/device firmware correspondence table 401. The input and output control unit 30 refers to the OS/device firmware correspondence table 401. The input and output control unit 30 specifies firmware and a version suitable for the device 102 of the device ID (S1) received from the IO device 10 from a list of the device IDs and designated FW_Vers 603 corresponding to the specified OS (step S4).

Specifically, the input and output control unit 30 determines whether or not there is firmware of a version matching the device ID received from the IO device 10 in the list of the device IDs and designated FW_Vers 603 corresponding to the specified OS. In a case where the input and output control unit 30 determines that there is firmware of a version matching the device ID, it is determined that the firmware of the matching version is firmware suitable for the device 102. On the other hand, in a case where the input and output control unit 30 determines that there is no firmware of a version matching the device ID, it is determined that there is no firmware suitable for the device 102.

According to the OS/device firmware correspondence table 401 shown in FIG. 6, for example, in a case where OS information is "OS-A/A3" and a device ID is "ID-01", the input and output control unit 30 specifies firmware "DEV01_V3". On the other hand, for example, in a case where OS information is "OS-A/A3" and a device ID is "ID-02", the input and output control unit 30 determines that there is no firmware of a version matching the device ID.

The input and output control unit 30 generates OS/firmware information including the device ID, the designated FW_Ver, and the OS information 602 (type/version) specified through the process of step S4.

Specifically, in a case where the input and output control unit 30 determines that there is firmware of a version matching the device ID, the input and output control unit 30 generates OS/firmware information including the specified device ID, designated FW_Ver, and OS information 602.

Further, in a case where the input and output control unit 30 determines that there is no firmware of a version matching the device ID, it is determined whether or not there is OS information 602. For example, the input and output control unit 30 determines whether the determined starting OS is in the list of the OS information 602 of the OS/device firmware correspondence table 401. According to the OS/device firmware correspondence table 401 in FIG. 6, for example, in a case where OS information is "OS-D/D1", the input and output control unit 30 determines that there is no OS information 602.

In a case where the input and output control unit 30 determines that there is OS information 602, the input and output control unit 30 generates OS/firmware information including a specified device ID, specified OS information 602, and a designated FW_Ver which is information indicating that information indicating a version is not included.

On the other hand, in a case where the input and output control unit 30 determines that there is no OS information 602, the input and output control unit 30 generates OS/firmware information including a specified device ID, OS information 602 which is information indicating that information indicating a version is not included, and a designated FW_Ver which is information indicating that information indicating a version is not included.

The input and output control unit 30 outputs the generated OS/firmware information to the IO device 10 (step S5).

The IO device control unit 101 receives the OS/firmware information from the input and output control unit 30 (step S6). The IO device control unit 101 executes a process of determining firmware to be started (step S7). The process of step S7 performed by the IO device control unit 101 will be described later in detail.

The IO device control unit 101 reads out firmware designated from the firmware 303 stored in the storage apparatus 103. The IO device control unit 101 executes the read-out firmware (step S8). Starting processing of the entire IO device 10 is performed by executing the firmware. The IO device control unit 101 determines whether or not the starting processing has been completed (step S9).

In a case where the IO device control unit 101 determines that the starting processing has not been completed (NO in step S9), the processing is returned to step S9.

Further, in a case where the IO device control unit 101 determines that the starting processing has been completed (YES in step S9), the IO device control unit notifies the input and output control unit 30 that the starting processing has been completed (step S10). For example, the IO device control unit 101 outputs a notification signal for giving notice of the completion of the starting processing to the input and output control unit 30.

The input and output control unit 30 receives the notification signal from the IO device 10. When the input and output control unit 30 receives the notification signal, the input and output control unit 30 executes a process of starting an OS (step S11). Meanwhile, a plurality of IO devices 10 may be added to the computer system 1. For this reason, the process of starting the OS by the input and output control unit 30 may be performed after the starting of all of the devices 102 added to the computer system 1 has been completed.

Next, the process of step S7 (FIG. 7) performed by the IO device control unit 101 will be described in detail with reference to FIG. 10.

Figure 10:
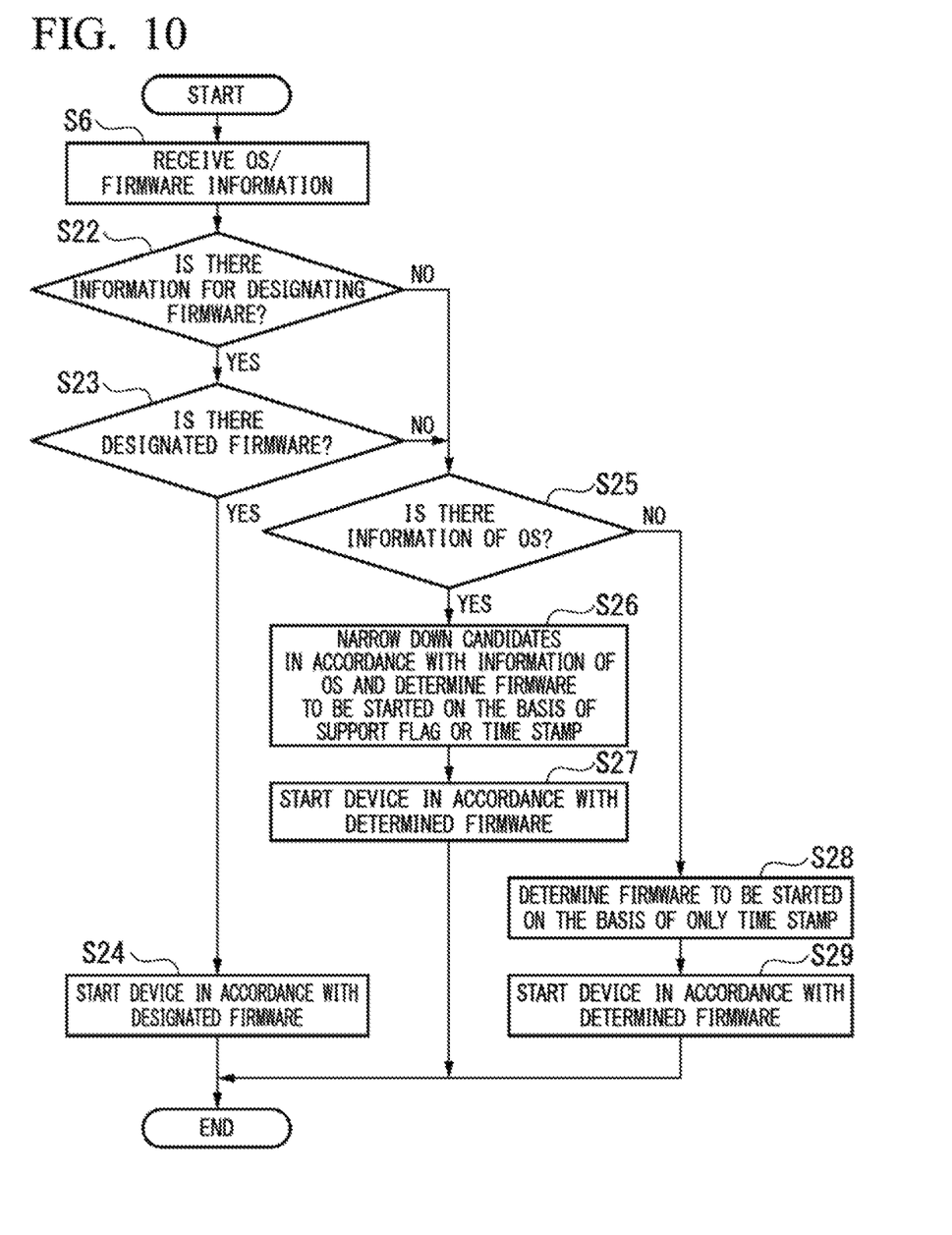
FIG. 10 is a second diagram showing a processing flow of the computer system according to the embodiment of the present invention.

FIG. 10 is a processing flow showing a process of determining firmware to be started.

The IO device control unit 101 performs the process of step S6 (FIG. 7). That is, the IO device control unit 101 receives OS/firmware information from the input and output control unit 30. The IO device control unit 101 determines whether or not the received OS/firmware information includes information for designating firmware, that is, whether or not a designated FW_Ver is information indicating a version (step S22). In a case where the IO device control unit 101 determines that the designated FW_Ver is information indicating a version, the IO device control unit 101 determines that the OS/firmware information includes information for designating firmware (YES in step S22). On the other hand, in a case where the IO device control unit 101 determines that the designated FW_Ver is information indicating that information indicating a version is not included, the IO device control unit 101 determines that the OS/firmware information does not include information for designating firmware (NO in step S22).

In a case where the IO device control unit 101 determines that the OS/firmware information includes information for designating firmware (YES in step S22), the IO device control unit 101 determines whether or not the firmware 303 (FIG. 3) stored in the storage apparatus 103 includes designated firmware, that is, firmware of a version indicated by the designated FW_Ver (step S23).

In a case where the IO device control unit 101 determines that the firmware 303 stored in the storage apparatus 103 includes designated firmware (YES in step S23), the IO device control unit 101 starts the device 102 in accordance with the firmware of the version indicated by the designated FW_Ver (step S24).

On the other hand, in a case where the IO device control unit 101 determines that the firmware 303 stored in the storage apparatus 103 does not include firmware designated (NO in step S23), the IO device control unit 101 determines whether or not the OS/firmware information includes the OS information 602 (step S25). That is, the IO device control unit 101 determines whether or not the received OS/firmware information includes effective OS information 602. Meanwhile, also in a case where the IO device control unit 101 determines that the OS/firmware information does not include information for designating firmware (NO in step S22), the IO device control unit performs the process of step S25.

In a case where the IO device control unit 101 determines that the OS/firmware information includes the OS information 602 (YES in step S25), the IO device control unit 101 narrows down OS candidates matching the version of an OS indicated by the OS information 602 in the firmware management table 302 (FIG. 5). In addition, the IO device control unit 101 determines one firmware started on the basis of the support flag 504 or the time stamp 503 among the narrowed-down OS candidates (step S26). That is, the IO device control unit 101 determines firmware on the basis of the OS information 602 with reference to the firmware management table 302.

For example, the IO device control unit 101 stores information of a user policy in the setting data 301 of the storage apparatus 103 in advance. The IO device control unit 101 may preferentially determine firmware indicated by the information of the user policy. The user policy is information for restricting conditions in determining firmware. In a case where firmware of a version suitable for the device 102 is not designated, the user policy allows a user to arbitrarily add conditions when the IO device control unit 101 determines firmware.

Examples of the user policy in this case include settings targeted at firmware of a stable version (stably operating firmware), setting targeted at firmware of the latest version, and the like. Alternatively, other examples of the user policy include setting that is targeted at firmware of the stable version and targeted at the latest version among those firmware, setting targeted at only firmware of a stable version, setting targeted at only firmware of the latest version, and the like. Alternatively, examples of the user policy include setting that is targeted at only firmware of a stable version and targeted at only the latest version among those firmware, and the like. The latest version indicates, for example, information having the latest time stamp.

The IO device control unit 101 specifies determined firmware in the firmware management table 302. For example, a case where the OS information 602 is "OS-A/A1" and the latest firmware of a stable version is set as user policy will be described. In this case, the IO device control unit 101 extracts an image ID "1" and an image ID "2" indicating a stable version "S" among image IDs corresponding to the OS information 602 in accordance with the firmware management table 302 in FIG. 5. The IO device control unit 101 selects the image ID "2" having the latest time stamp among the extracted image ID "1" and the image ID "2".

The IO device control unit 101 reads out the specified firmware from the storage apparatus 103. The IO device control unit 101 starts the device 102 in accordance with the read-out firmware (step S27).

On the other hand, in a case where the IO device control unit 101 determines that the OS/firmware information does not include the OS information 602 (NO in step S25), the IO device control unit 101 determines one firmware started on the basis of the time stamp 503 (step S28). Specifically, information of a user policy is stored in the setting data 301 in advance, and the IO device control unit 101 determines firmware on the basis of the information of the user policy and the time stamp 503 of the firmware management table 302 (FIG. 5). Examples of the user policy in this case include setting for determining firmware of the latest version, setting for determining firmware of a version having the largest number of flags indicating a stable version in the support flag 504, and the like.

For example, as a user policy, a case where the determination of firmware of the latest version is set will be described. In this case, the IO device control unit 101 selects an image ID "3" having the latest time stamp 503 in accordance with, for example, the firmware management table 302 in FIG. 5.

The IO device control unit 101 specifies the determined firmware in the firmware management table 302. The IO device control unit 101 reads out the specified firmware from the storage apparatus 103. The IO device control unit 101 starts the device 102 in accordance with the read-out firmware (step S29).

The computer system 1 according to the embodiment of the present invention has been described above. In the computer system 1 according to the embodiment of the present invention, the IO device control unit 101 stores a user policy in the storage unit 103 in advance, the user policy being for defining conditions for determining firmware in a case where information indicating that information indicating a version is not included as version information of firmware recommended for the device 102 has been acquired when firmware is determined.

In addition, the IO device control unit 101 determines firmware to be applied to the device 102 on the basis of a user policy in a case where information indicating that information indicating a version is not included as version information of firmware recommended for the device 102 has been acquired.

In this way, the user can set a user policy defining the conditions for determining the firmware to have any conditions. As a result, in the computer system 1, the IO device 10 can determine a user's desired firmware in a case where there is no version of recommended firmware.

Figure 11:
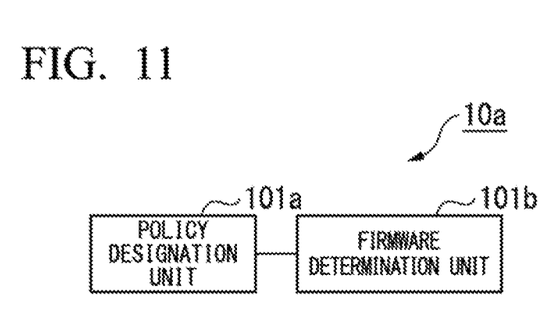
FIG. 11 is a diagram showing a minimum configuration of an SAN storage apparatus according to the embodiment of the present invention.

FIG. 11 is a diagram showing a minimum configuration of a device 10*a* according to an embodiment of the present invention.

The device 10*a* is a device which is added to a computer system and operated by firmware. The device 10*a* includes a policy designation unit 101*a* and a firmware determination unit 101*b* as shown in FIG. 11.

The policy designation unit 101*a* stores a user policy in a storage unit in advance, the user policy being for defining conditions for determining the firmware in a case where information indicating that information indicating a version is not included as version information of the firmware recommended for the device has been acquired when the firmware is determined. That is, the policy designation unit 101*a* holds a user policy for defining conditions for determining firmware in a case where there is no version information of firmware recommended for the device 10*a*.

The firmware determination unit 101*b* determines the firmware to be applied to the device on the basis of the user policy in a case where information indicating that information indicating a version is not included as version information of the firmware recommended for the device has been acquired. That is, the firmware determination unit 101*b* determines firmware to be applied to the device 10*a* on the basis of a user policy in a case where information indicating that there is no version information of firmware recommended for the device 10*a* has been acquired when firmware is determined.

Meanwhile, regarding the processing in the embodiment of the present invention, the order of processing may be changed within a range in which appropriate processing is performed.

Each of the storage apparatus 20, the storage apparatus 103, the main storage apparatus 50, the auxiliary storage apparatus 60, and the other storage apparatuses in the embodiment of the present invention may be provided at any location in a range in which information is appropriately transmitted and received. In addition, each of the storage apparatus 20, the storage unit 103, the main storage apparatus 50, the auxiliary storage apparatus 60, and the other storage apparatuses may be plural in number and may store data dispersively in a range in which information is appropriately transmitted and received.

Although the embodiment of the present invention has been described, the IO device 10, the device 10*a*, and the other control apparatuses described above may include a computer system therein. In addition, the process of the above-described processing is stored in a computer-readable storage in a format of a program, and the program is read out and executed by a computer, whereby the processing is performed. A specific example of the computer will be described below.

Figure 12:
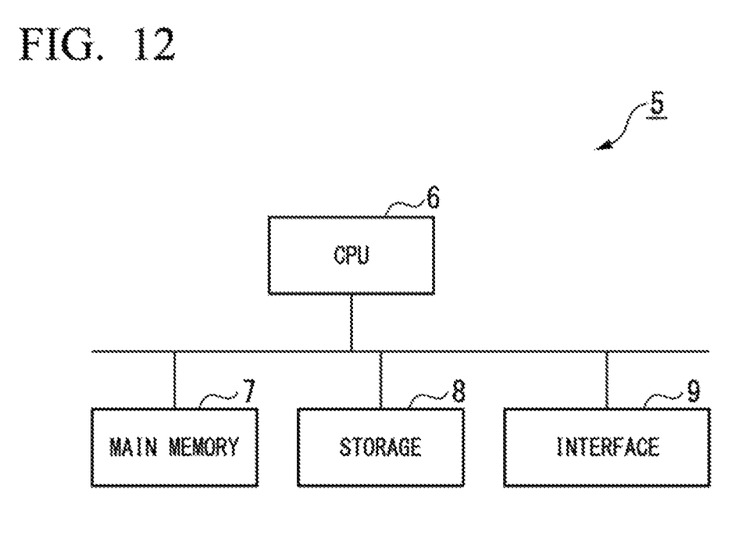
FIG. 12 is a schematic block diagram showing a configuration of a computer according to at least one embodiment.

FIG. 12 is a schematic block diagram showing a configuration of a computer according to at least one embodiment.

A computer 5 includes a CPU 6, a main memory 7, a storage 8, and an interface 9 as shown in FIG. 12.

For example, each of the IO device 10, the device 10a, and the other control apparatuses described above is mounted on the computer 5. In addition, the operation of each of the above-described processing units is stored in the storage 8 in a format of a program. The CPU 6 reads out a program from the storage 8 and develops the program to the main memory 7 and executes the above-described processing in accordance with the program. In addition, the CPU 6 secures a storage region corresponding to each of the above-described storage units in the main memory 7 in accordance with the program.

In addition, the computer system 1 may include the above-described computer system, that is, the computer 5 shown in FIG. 12.

Examples of the storage 8 include a hard disk drive (HDD), a solid state drive (SSD), a magnetic disc, a magneto-optical disc, a compact disc read only memory (CD-ROM), a digital versatile disc read only memory (DVD-ROM), a semiconductor memory, and the like. The storage 8 may be an internal medium which is directly connected to a bus of the computer 5 or may be an external medium which is connected to the computer 5 through the interface 9 or a communication circuit. Further, in a case where the program is distributed to the computer 5 by the communication circuit, the computer 5 having the program distributed thereto may develop the program to the main memory 7 and execute the above-described processing. In at least one embodiment, the storage 8 is a non-transitory tangible storage medium.

In addition, the above-described program may realize some of the above-described functions. Further, the program may be a file capable of being realized by combining the above-described functions with a program recorded in the computer system in advance, that is, a so-called differential file (differential program).

Although some embodiments of the present invention have been described, these embodiment are examples and do not limit the scope of the invention. Various additions, omission, replacements, and changes can be made to these embodiments without departing from the gist of the invention.

The application is based on Japanese Patent Application No. 2018-069998 filed on Mar. 30, 2018, the content of which is incorporated herein by reference.

INDUSTRIAL APPLICABILITY

According to the aspects of the present invention, it is possible to determine a user's desired firmware in a case where there is no version of firmware recommended for a device.

REFERENCE SIGNS LIST

1 Computer system
5 Computer
6 CPU
7 Main memory
8 Storage
9 Interface
10 IO device
10a, 102 Device
20 Storage apparatus
30 Input and output control unit
40 Central processing unit
50 Main storage apparatus
60 Auxiliary storage apparatus
101 IO Device control unit
101a Policy designation unit
101b Firmware determination unit
103 Storage apparatus

The invention claimed is:

1. A device comprising:
at least one memory configured to store instructions; and
at least one processor configured to execute the instructions to cause the at least one memory to: store, in advance, a user policy for defining conditions, which indicate a priority between a stability of operation of firmware and a latest version of the firmware, for determining a version of a firmware to be started on the device which is added to a computer system and operated by the firmware;
determine, debased on firmware information about the firmware to be started on the device, the version of the firmware to be started on the device based on the priority indicated by the user policy, wherein the firmware information does not include version information of the firmware;
add, to the device, the firmware corresponding to the determined version; and
operate the device according to the added firmware.

2. The device according to claim 1, wherein the user policy defines, as the conditions, determining that a firmware version allows stable operation.

3. The device according to claim 1, wherein the user policy defines, as the conditions, determining that a firmware version has a highest stability among a plurality of versions allowing stable operation.

4. The device according to claim 1, wherein the user policy defines, as the conditions, determination to be the firmware of the latest version among a plurality of versions.

5. A device-based firmware determination method performed by a device, the device-based firmware determination method comprising:
causing a memory to store, in advance, a user policy for defining conditions, which indicate a priority between a stability of operation of firmware and a latest version of the firmware, for determining a version of a firmware to be started on the device which is added to a computer system and operated by the firmware;
determining, based on firmware information about the firmware to be started on the device, the version of the firmware to be started on the device based on the priority indicated by the user policy, wherein the firmware information does not include version information of the firmware;
adding, to the device, the firmware corresponding to the determined version; and
operating the device according to the added firmware.

6. A non-transitory computer-readable recording medium storing a program causing a computer of a device to execute processes, the processes comprising:
causing a memory to store, in advance, a user policy for defining conditions, which indicate a priority between a stability of operation of firmware and a latest version of the firmware, for determining a version of a firmware to be started on the device which is added to a computer system and operated by the firmware;
determining, based on firmware information about the firmware to be started on the device, the version of the firmware to be started on the device based on the priority indicated by the user policy, wherein the firmware information does not include version information of the firmware;

adding, to the device, the firmware corresponding to the determined version; and operating the device according to the added firmware.

7. The device according to claim 1, wherein the at least one processor is configured to execute the instructions to acquire information of a firmware recommended for the device that is specified based on a device ID for identifying the device.

\* \* \* \* \*